April 17, 1928.
H. W. TINKER
1,666,317
BUMPER DEVICE FOR VEHICLES
Filed April 17, 1926
2 Sheets-Sheet 1
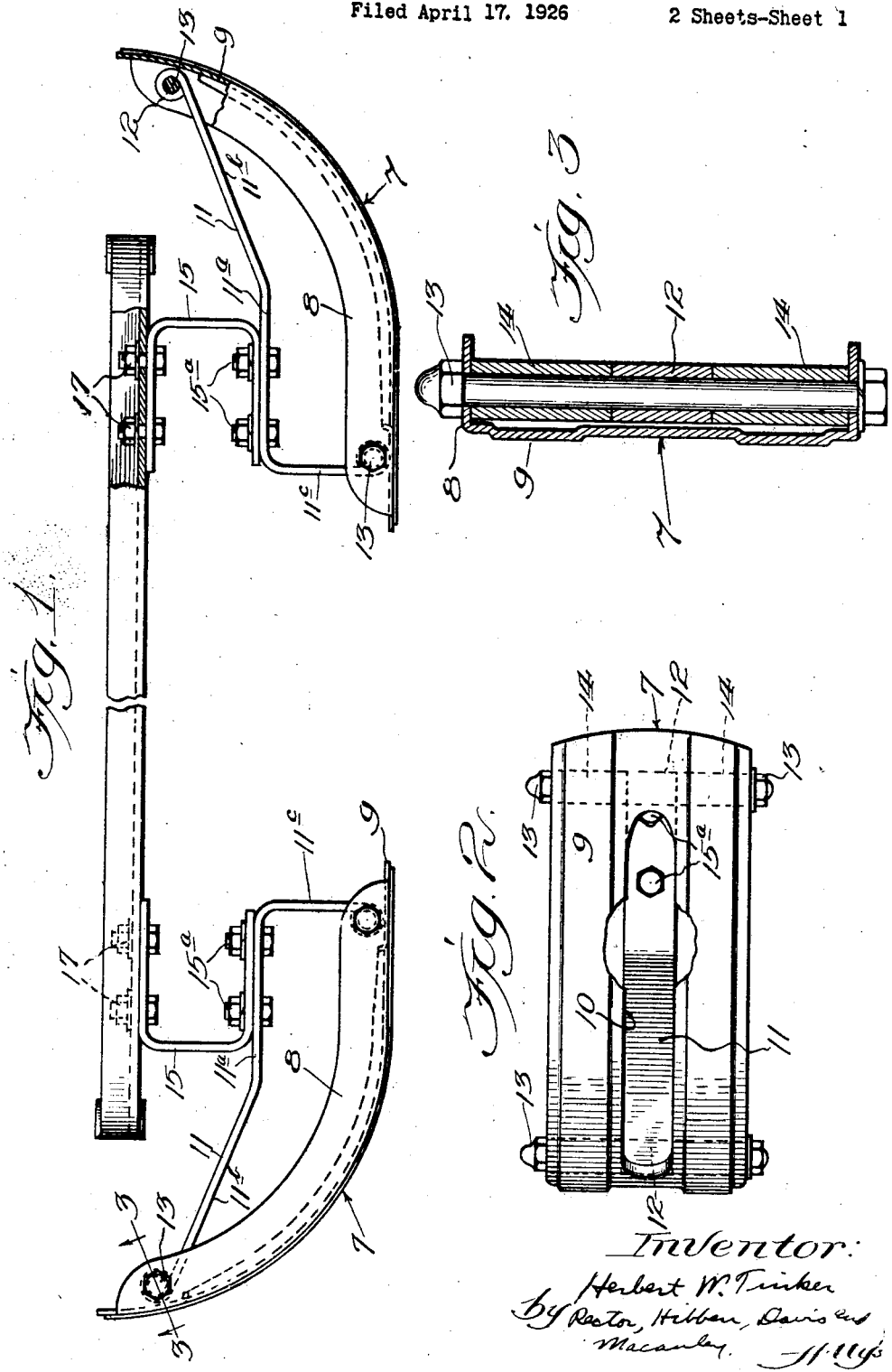

April 17, 1928.
H. W. TINKER
1,666,317
BUMPER DEVICE FOR VEHICLES
Filed April 17, 1926
2 Sheets-Sheet 2
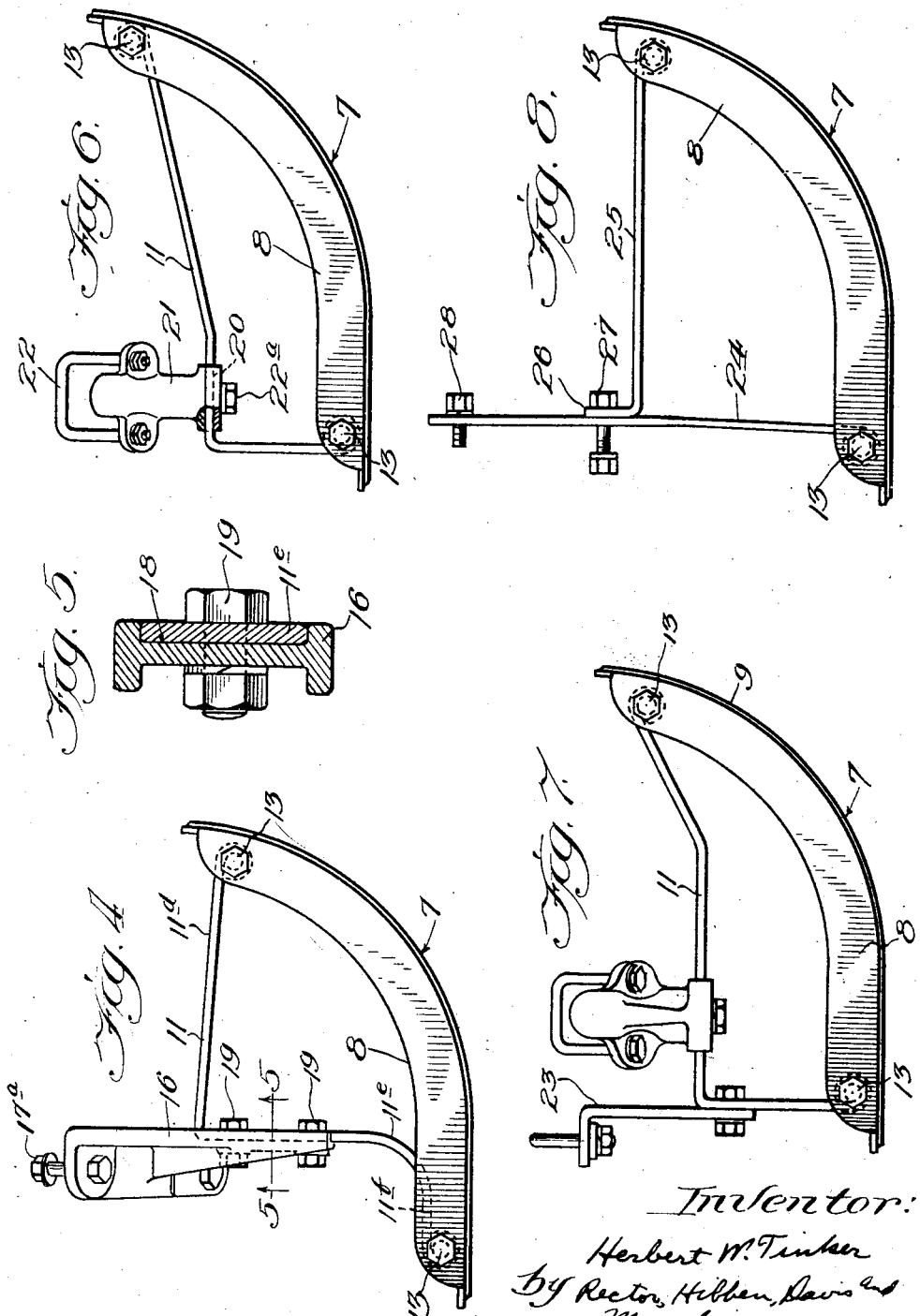

Patented Apr. 17, 1928.

1,666,317

UNITED STATES PATENT OFFICE.

HERBERT W. TINKER, OF MILWAUKEE, WISCONSIN, ASSIGNOR TO FEDERAL PRESSED STEEL COMPANY, OF MILWAUKEE, WISCONSIN, A CORPORATION OF WISCONSIN.

BUMPER DEVICE FOR VEHICLES.

Application filed April 17, 1926. Serial No. 102,805.

My invention relates to bumper devices for vehicles, and more particularly to that class generally known as fender guards, in which the impact members at the rear of the vehicle are spaced apart to accommodate a spare tire therebetween.

The principal object of my invention is to provide improved means for supporting the impact member of each fender guard and also improved means for mounting the fender guards on the vehicle frame.

The above and further objects and advantages of my improved fender guard structure will become apparent from the following description, taken in conjunction with the accompanying drawings.

In said drawings, Fig. 1 is a top plan view showing fender guards mounted on the rear end of a chassis frame; Fig. 2 is a rear elevation of the left hand fender guard shown in Fig. 1; Fig. 3 is a cross-sectional view taken through one end of one of the fender guards as on the line 3—3 of Fig. 1; Fig. 4 is a top plan view of a fender guard embodying modified supporting means; Fig. 5 is a cross-sectional view taken through the securing bracket shown in Fig. 4, the section being taken as on the line 5—5 of Fig. 4; and Figs. 6, 7 and 8 are top plan views of fender guards embodying still further modifications.

The impact bars or members shown in the various views are alike and of arcuate form and each preferably consists of a sheet metal bar 7, pressed in a die to form rearwardly extending flanges 8 at the upper and lower edges of its web or face 9 which is provided with an elongated flanged opening 10 Fig. (2).

As shown in Fig. 1, the impact bar 7 is supported by a one-piece spring-supporting bar or strap 11, having eyes 12 (Figs. 1, 2 and 3) integrally formed at its ends for the reception of bolts 13 which project through holes in the flanges 8 and through the integral eyes 12 and suitable spacing collars 14 which are positioned between the eyes 12 and the flanges 8. It will be noted that the spring bar 11 is bent to provide a laterally extending portion 11$^a$, a forwardly inclined portion 11$^b$ and a rearwardly extending arm 11$^c$. The portion 11$^a$ is connected by bolts 15$^a$ to a bracket 15 which is secured to the rear transverse bar or other part of the automobile chassis, by means of bolts 17 or any other desirable means. The bracket 15 is formed of a strap of spring steel and is preferably bent to provide a U-shaped formation, as best shown in Fig. 1.

In the modification shown in Fig. 4 the spring supporting bar 11 is connected at its ends to the ends of the impact member 7, as in the preferred form, but it is differently formed to provide an outwardly extending arm 11$^d$, a rearwardly projecting portion 11$^e$ curved at its rear end, and an inwardly extending arm 11$^f$ into which the curve merges. The portion 11$^e$ is connected by bolts 19 to the side of a rigid bracket 16 which is adapted to be secured to the rear end of the vehicle frame by suitable bolts 17$^a$ or otherwise. The bracket 16 is provided with a groove 18 (Fig. 5) in which snugly fits the portion 11$^e$.

In the modification shown in Fig. 6, the spring supporting bar 11 is differently shaped, being generally in the form of an L. The ends of the bar are provided with integral eyes through which the bolts 13 extend, as in the forms of embodiment described above. The spring bar 11 projects through a slot 20 formed in a securing bracket 21, which is adapted to be connected to the end of the side sill of the chassis by means of a U-bolt 22 or by any other desired means. A screw 22$^a$ fastens the bar 11 in the slot 20.

The modified fender guard shown in Fig. 7 is substantially like that shown in Fig. 6, except it is provided with an additional arm 23 for securing the supporting bar to the chassis frame or to a tire-carrier. This arm 23 is preferably formed of a strap of spring metal and is L-shaped. It is connected by a bolt at its rear end to the rearwardly extending arm of the supporting bar 11 and a U-bolt is adapted to secure its forward end to the chassis frame or tire-carrier.

In Fig. 8 I have shown the impact bar of the fender guard supported by means of two spring bars or straps 24 and 25. The spring bar 24 extends rearwardly and at its rear end is provided with an eye through which one of the bolts 13 extends, as in the other forms. The spring bar 25 projects laterally and its outer end is likewise provided with an eye through which the other bolt 13 projects. The inner end of the bar 25 is bent forwardly to provide a portion 26 engaging against the bar 24. A bolt 27 is adapted to project through the portion 26, the bar 24 and the end of the side sill and a bolt 28 is adapted to project through the forward end of the bar 24 and through a hole in the side sill, the fender guard being secured to the chassis by means of these bolts 27 and 28.

I claim:

1. An impact member comprising a channel bar of arcuate form, a flexible strap member having its opposite ends pivotally connected to the said bar adjacent to the ends thereof, and means for securing said strap member to a frame.

2. An impact member comprising a bumper bar of arcuate form, and means for securing said bar to one corner of a vehicle, comprising a strap having its ends connected to said bar adjacent to the end portions thereof, and a second strap member having one end connected to an intermediate portion of the first-named strap and its other end adapted for connection to a vehicle frame.

3. An impact member comprising a bumper bar of arcuate form and means for securing said bar to one corner of a vehicle, comprising a flexible strap having its ends pivotally connected to said bar adjacent to the end portions thereof and a second flexible strap member having one end rigidly connected to an intermediate portion of the first named strap and its other end adapted for connection to the vehicle frame.

In testimony whereof, I have subscribed my name.

HERBERT W. TINKER.